(12) United States Patent
Targali et al.

(10) Patent No.: US 11,910,480 B2
(45) Date of Patent: Feb. 20, 2024

(54) SYSTEMS AND METHODS FOR NULL-SCHEME ACCESS AUTHORIZATION

(71) Applicant: Verizon Patent and Licensing Inc., Basking Ridge, NJ (US)

(72) Inventors: Yousif Targali, Sammamish, WA (US); Vinod Kumar Choyi, Conshohocken, PA (US); Sudhakar Reddy Patil, Flower Mound, TX (US); Michael A. Gallagher, Dublin, OH (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 245 days.

(21) Appl. No.: 17/233,030

(22) Filed: Apr. 16, 2021

(65) Prior Publication Data
US 2022/0337994 A1 Oct. 20, 2022

(51) Int. Cl.
*H04W 12/06* (2021.01)
*H04W 8/20* (2009.01)
*H04W 60/04* (2009.01)
*H04W 8/12* (2009.01)

(52) U.S. Cl.
CPC ............... *H04W 8/20* (2013.01); *H04W 8/12* (2013.01); *H04W 12/06* (2013.01); *H04W 60/04* (2013.01)

(58) Field of Classification Search
None
See application file for complete search history.

(56) References Cited

U.S. PATENT DOCUMENTS

2019/0098502 A1* 3/2019 Torvinen ................. H04L 63/06

* cited by examiner

*Primary Examiner* — Gary Lafontant

(57) ABSTRACT

A method may include receiving, at a network device, a registration request that comprises a subscription concealed identifier (SUCI) associated with a particular user equipment (UE) device. The network device determines whether the SUCI indicates a request for null-scheme network access; and retrieves a scheme authorization parameter for the UE device when it is determined that the SUCI indicates a request for null-scheme network access. The scheme authorization parameter indicates whether the UE device is authorized for null-scheme access to a service provider network. The network device determines whether the UE device is authorized for null-scheme network access based on the retrieved scheme authorization parameter and performs processing associated with null-scheme network access when it is determined that the particular UE device is authorized for null-scheme network access.

20 Claims, 9 Drawing Sheets

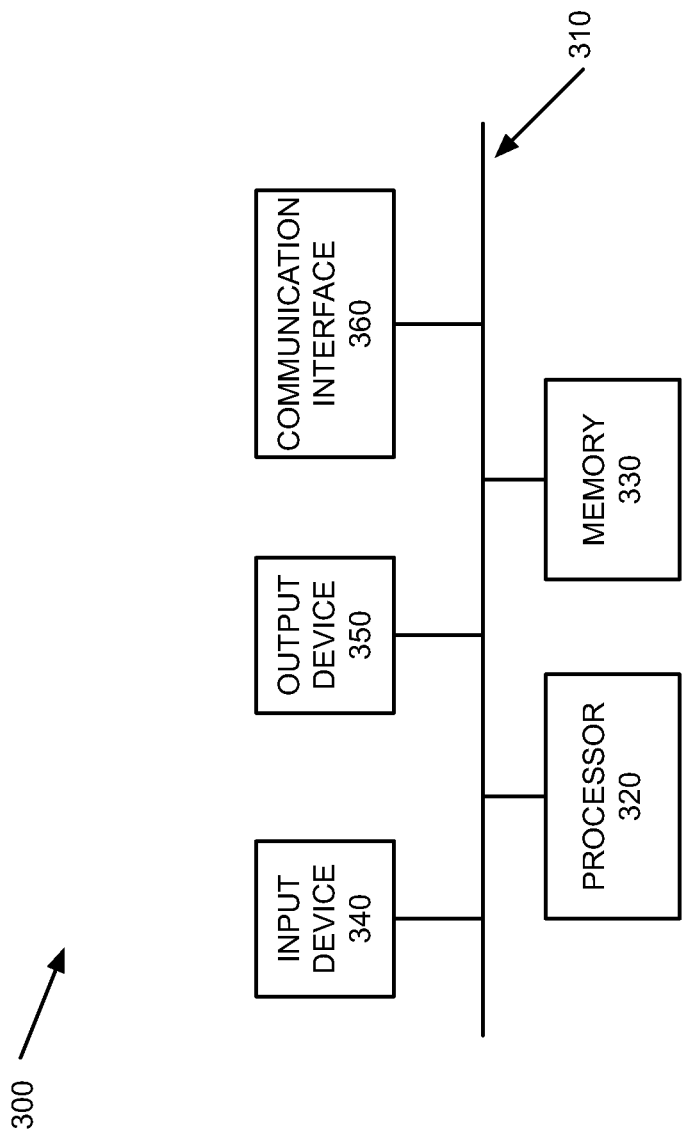

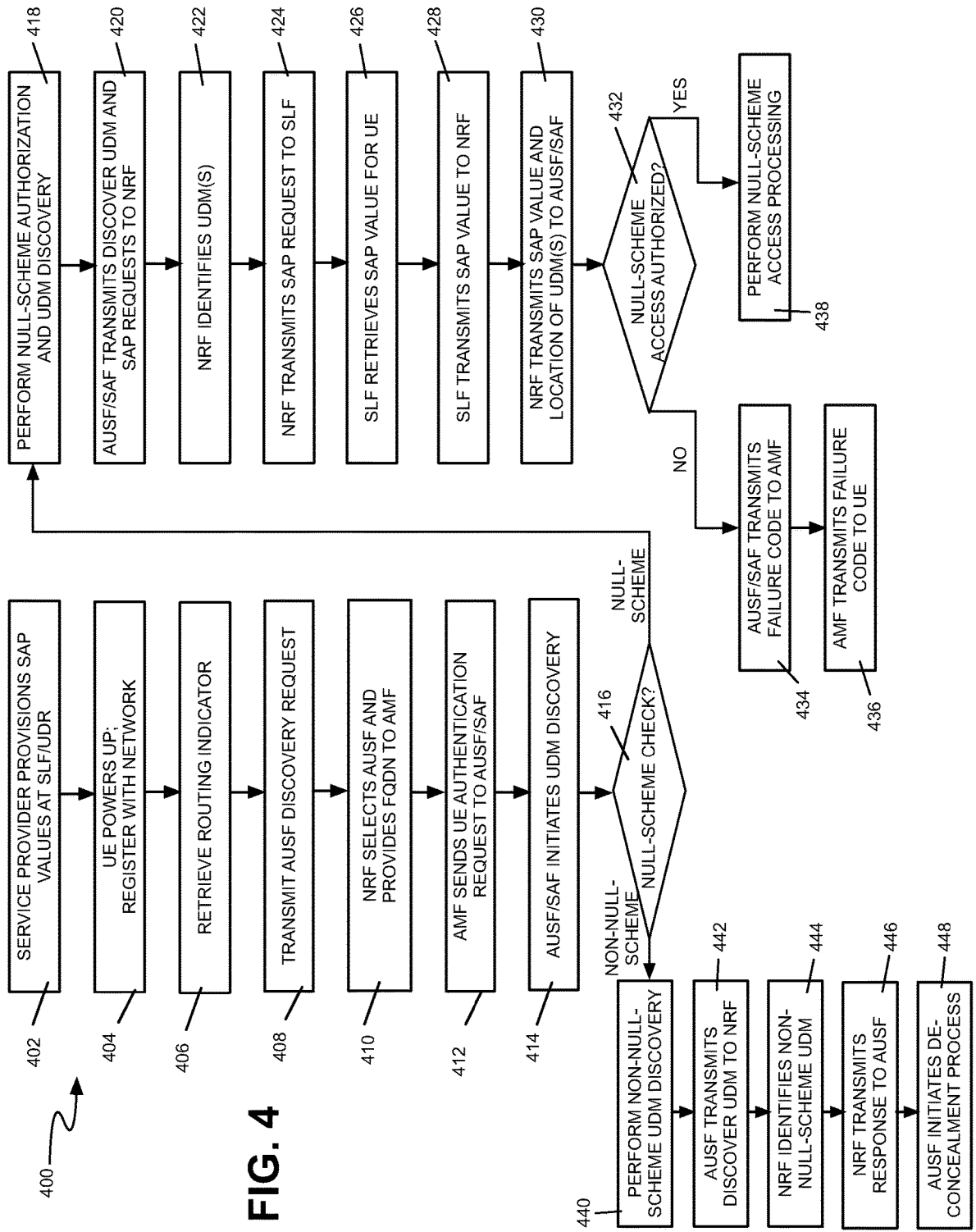

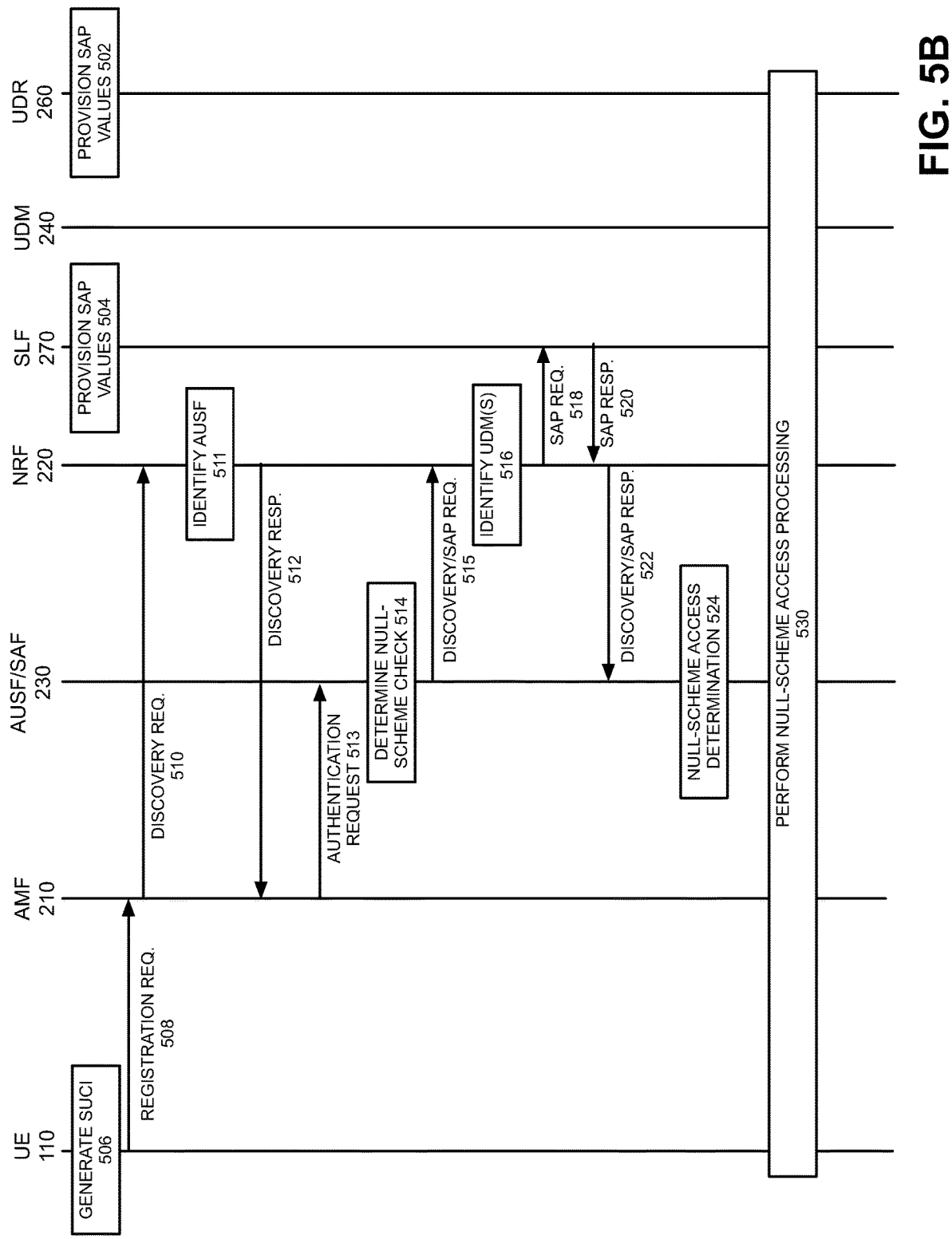

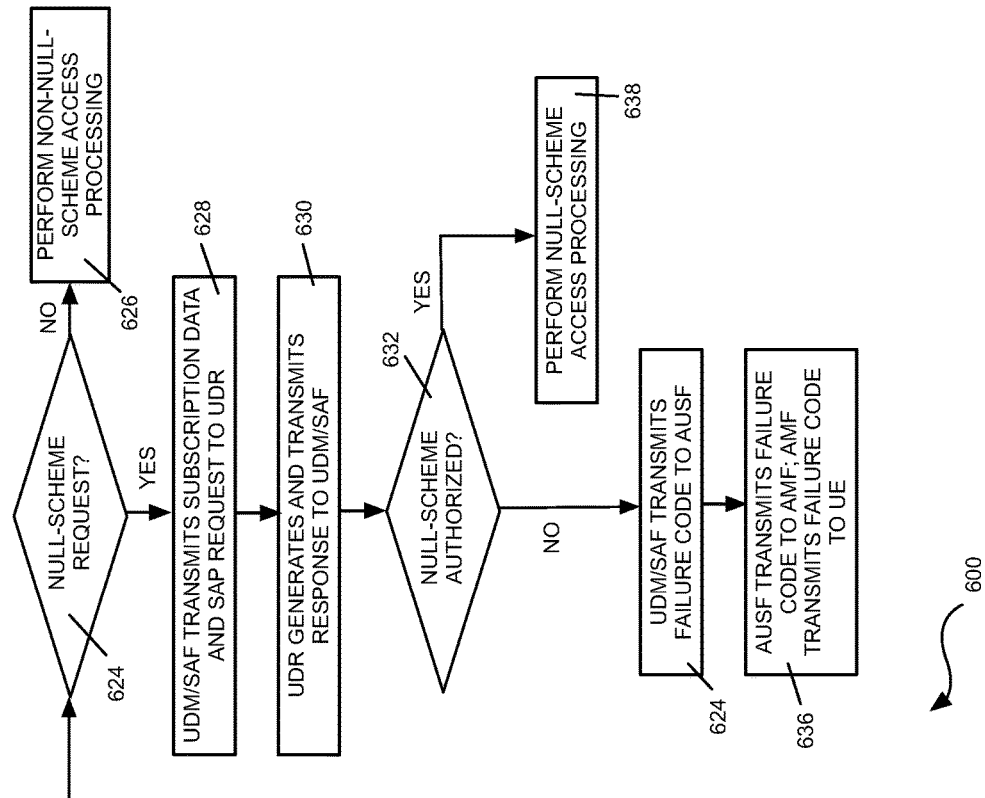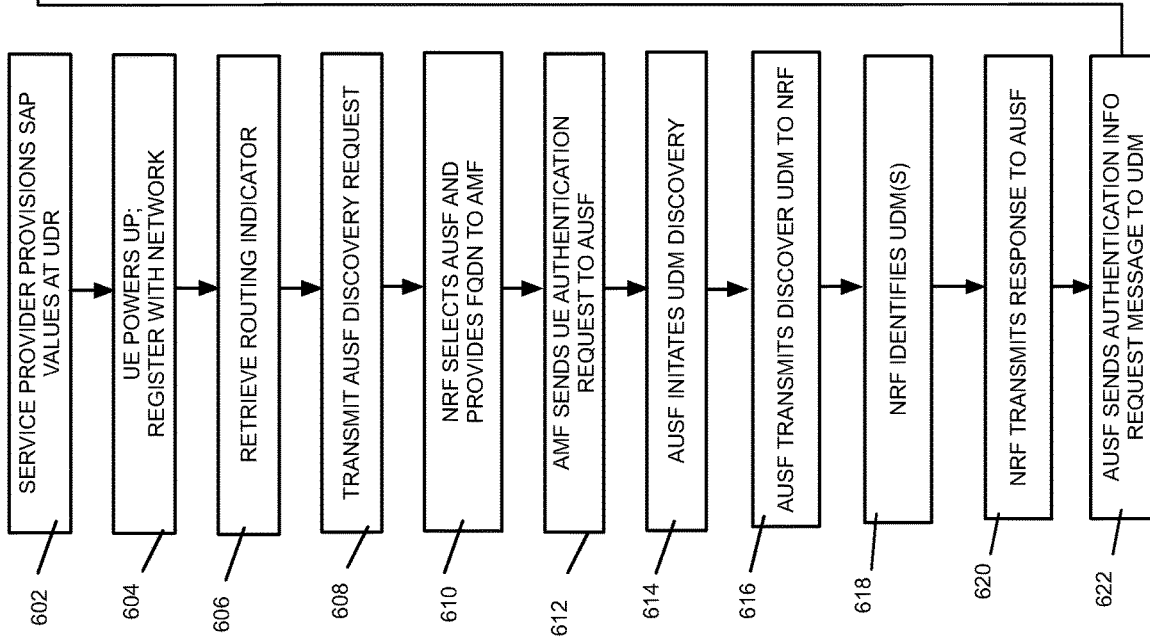
FIG. 6

SYSTEMS AND METHODS FOR NULL-SCHEME ACCESS AUTHORIZATION

BACKGROUND INFORMATION

In a telecommunications system, a network operator typically allocates a unique identifier, such as International Mobile Subscriber Identify (IMSI) and/or a Fifth Generation (5G) Subscription Permanent Identifier (SUPI), to each Universal Subscriber Identity Module (USIM) within a Universal Integrated Circuit Card (UICC) card when the UICC is manufactured or provisioned. To avoid privacy breaches associated with transmitting IMSI/SUPI data in plain text over a radio access link, the network operator also typically assigns a temporary identifier, such as a Global Unique Temporary Identifier (GUTI) after the registration process. The GUTI may then be used for identification purposes during the lifetime of the connection.

However, in some situations, the use of a temporary identifier is not possible. For example, when a user device registers with a network for the first time or each time a user device is turned-on, the service provider has not yet assigned a temporary identifier to the user device. In such situations, the 3rd Generation Partnership Project (3GPP) has introduced the use of encryption to transmit a SUPI over a radio access link. In particular, when a 5G device requests registration with a network, the 5G device may transmit a Subscription Concealed Identifier (SUCI) that includes an encrypted SUPI to allow the user device to avoid transmitting the SUPI via plain text.

In some instances, a 5G device may request "null-scheme" or unauthenticated access to the network. Traditionally, such null-scheme access is enabled only during emergency calls. However, it may be desirable to enable null-scheme access in other non-emergency registration requests. For example, when a UICC has not been properly provisioned to enable generation of a SUCI, when the 5G device includes a 4G subscriber identification module (SIM) card that is not capable of generating a SUCI, or when a malicious man in the middle actor is impersonating a 5G subscriber.

BRIEF DESCRIPTION OF THE DRAWINGS

FIG. 3 is a block diagram of components associated with one or more of the elements of FIGS. 1 and 2;

FIG. 4 is a flow diagram illustrating processing associated with authentication of user devices in accordance with an exemplary implementation;

FIGS. 5A and 5B are exemplary signal flow diagrams associated with the processing of FIG. 4;

FIG. 6 is a flow diagram illustrating processing associated with authentication of user devices in accordance with another exemplary implementation;

DETAILED DESCRIPTION OF EXAMPLE EMBODIMENTS

The following detailed description refers to the accompanying drawings. The same reference numbers in different drawings may identify the same or similar elements.

Implementations described herein provide for an authorization system and process for providing null-scheme access to a 5G network. For example, in situations in which a 5G user equipment (UE) device requests registration via a base station of a radio access network (RAN), components of the 5G network may ascertain whether the 5G UE device has requested null-scheme access and may determine whether the 5G UE device is authorized to register with the network via null-scheme access. In particular, a scheme authorization parameter may be created for subscriber devices that indicates whether a particular 5G UE device is authorized for non-emergency null-scheme access. In response to a requested non-emergency null-scheme registration request, the scheme authorization parameter may be checked to determine whether the requested access is authorized for the particular 5G UE device.

Figure 1:
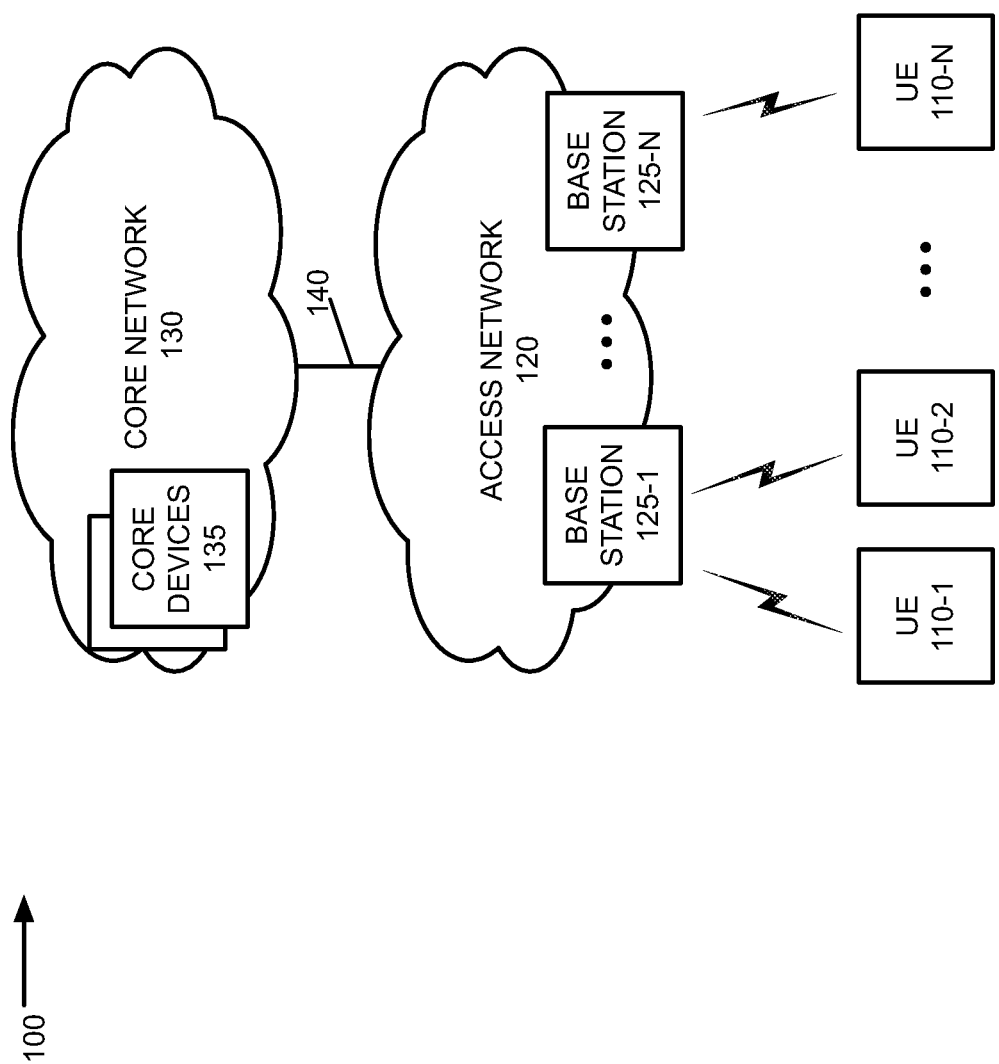
FIG. 1 illustrates an exemplary environment in which systems and methods described herein may be implemented.

FIG. 1 is a diagram illustrating an exemplary environment 100 in which systems and methods described herein may be implemented. Referring to FIG. 1, environment 100 includes user equipment (UE) devices 110-1 through 110-N (collectively referred to as UEs 110 or UE devices 110 and individually as UE 110 or UE device 110), access network 120 and core network 130. Elements of environment 100 may include network devices, network elements and/or network functions (referred to herein as network devices) that may be implemented according to one or multiple network architectures (e.g., a client device, a server device, a peer device, a proxy device, a cloud device, a virtualized function, and/or another type of network architecture (e.g., Software Defined Network (SDN), virtual, logical, network slicing, etc.)). Additionally, a network device, element or function may be implemented according to various computing architectures, such as centralized, distributed, cloud (e.g., elastic, public, private, etc.), edge, fog, and/or another type of computing architecture.

Environment 100 includes communication links between devices, such as links between UEs 110 and access network 120 and links between access network 120 and core network 130, such as link 140. The links in environment 100 may include wired, optical, and/or wireless communication links. In addition, connections between devices in environment 100 may be direct or indirect.

UEs 110 may each include a mobile device, such as wireless or cellular telephone device (e.g., a conventional cell phone with data processing capabilities), a smart phone, a personal digital assistant (PDA) that can include a radiotelephone, etc. In another implementation, UE 110 may include any type of mobile or fixed computer device or system, such as a personal computer (PC), a laptop, a tablet computer, a notebook, a netbook, a wearable computer (e.g., a wrist watch, eyeglasses, etc.), a game playing device, a music playing device, etc. In other implementations, UEs 110 may be implemented as a machine-type communications (MTC) device, an Internet of Things (IoT) device, a machine-to-machine (M2M) device, etc., that includes communication functionality, such as a home appliance device, a home monitoring device, a camera, etc. UEs 110 may connect to access network 120 in a wireless manner. UE 110 and the person associated with UE 110 (e.g., the party holding or using UE 110) may be referred to collectively as UE 110 in the description below.

In an exemplary implementation, UEs 110 use wireless channels to communicate with base stations 125. The wireless channels may correspond, for example, to a physical layer in accordance with different radio access technology (RAT) types. For example, wireless channels may correspond to physical layer associated with Fifth Generation (5G) New Radio (NR) standards. In other implementations, the wireless channels may correspond to physical layers associated with Fourth Generation Long Term Evolution (4G LTE), 4.5G or other air interfaces. In an exemplary implementation, UEs 110 may be 5G-capable devices that provide voice communication, mobile broadband services (e.g., video streaming, real-time gaming, high speed Internet access etc.), best effort data traffic, and/or other types of applications via a 5G NR service using various frequency bands, including millimeter wave (mmWave) radio frequencies.

Access network 120 may include a radio access network (RAN) that provides a connection between UEs 110 and core network 130. For example, access network 120 may include base stations 125-1 through 125-N (referred to collectively as base stations 125 and individually as base station 125 or base station 125-x). Access network 120 and base stations 125 may support multiple networks of multiple types and technologies. In an exemplary implementation, access network 120 may include a 5G RAN, a 4.5G RAN, a 4G RAN, and/or another type of future generation RAN. According to various exemplary implementations, access network 120 may also be implemented to include various architectures associated with wireless services, such as, for example, macrocell, microcell, femtocell, picocell, metrocell, 5G NR cell, LTE cell, non-cell, or another type of cell architecture.

Each base station 125 may service a number of UEs 110. In one implementation, base station 125 may include a 5G base station (e.g., a next generation NodeB (gNB)) that includes one or more radio frequency (RF) transceivers. For example, base station 125 may include three RF transceivers and each RF transceiver may service a 120 degree sector of a 360 degree field of view. Each RF transceiver may include or be coupled to an antenna array. The antenna array may include an array of controllable antenna elements configured to send and receive 5G NR wireless signals via one or more antenna beams. In some implementations, base station 125 may also include a 4G base station (e.g., an evolved NodeB (eNB)) that communicates wirelessly with UEs 110 located within the service range of base station 125. In still other implementations, base station 125 may include a radio network controller (RNC), a remote radio head (RRH), a baseband unit (BBU), a small cell node (e.g., a picocell device, a femtocell device, a microcell device, a home eNB, a repeater, etc.), or another type of wireless node.

Core network 130 may include one or more wired, wireless and/or optical networks that are capable of receiving and transmitting data, voice and/or video signals. For example, core network 130 may include one or more public switched telephone networks (PSTNs), one or more satellite networks, one or more packet switched networks, such as an Internet protocol (IP) based network, a software defined network (SDN), a local area network (LAN), a personal area network (PAN), a WiFi network, a Bluetooth network, a wide area network (WAN), a 5G network, a 4G network, a 4G LTE Advanced network, an intranet, the Internet, or another type of network that is capable of transmitting data. Core network 130 may provide packet-switched services and wireless Internet protocol (IP) connectivity to various components in environment 100, such as UEs 110 to provide, for example, data, voice, and/or multimedia services.

In an exemplary implementation, core network 130 may include various types of network devices, such as core devices 135. In an exemplary implementation, core devices 135 may include elements of a 5G network used to authenticate UEs 110, as described in detail below.

The exemplary configuration illustrated in FIG. 1 is provided for simplicity. It should be understood that a typical environment may include more or fewer devices than illustrated in FIG. 1. For example, environment 100 may include a large number (e.g., hundreds or more) of UEs 110 and base stations 125, as well as multiple access networks 120 and/or core networks 130. Environment 100 may also include elements, such as switches, gateways, routers, monitoring devices, etc. (not shown), that aid in routing data in environment 100.

Various functions are described below as being performed by particular components in environment 100. In other implementations, various functions described as being performed by one device may be performed by another device or multiple other devices, and/or various functions described as being performed by multiple devices may be combined and performed by a single device.

Figure 2:
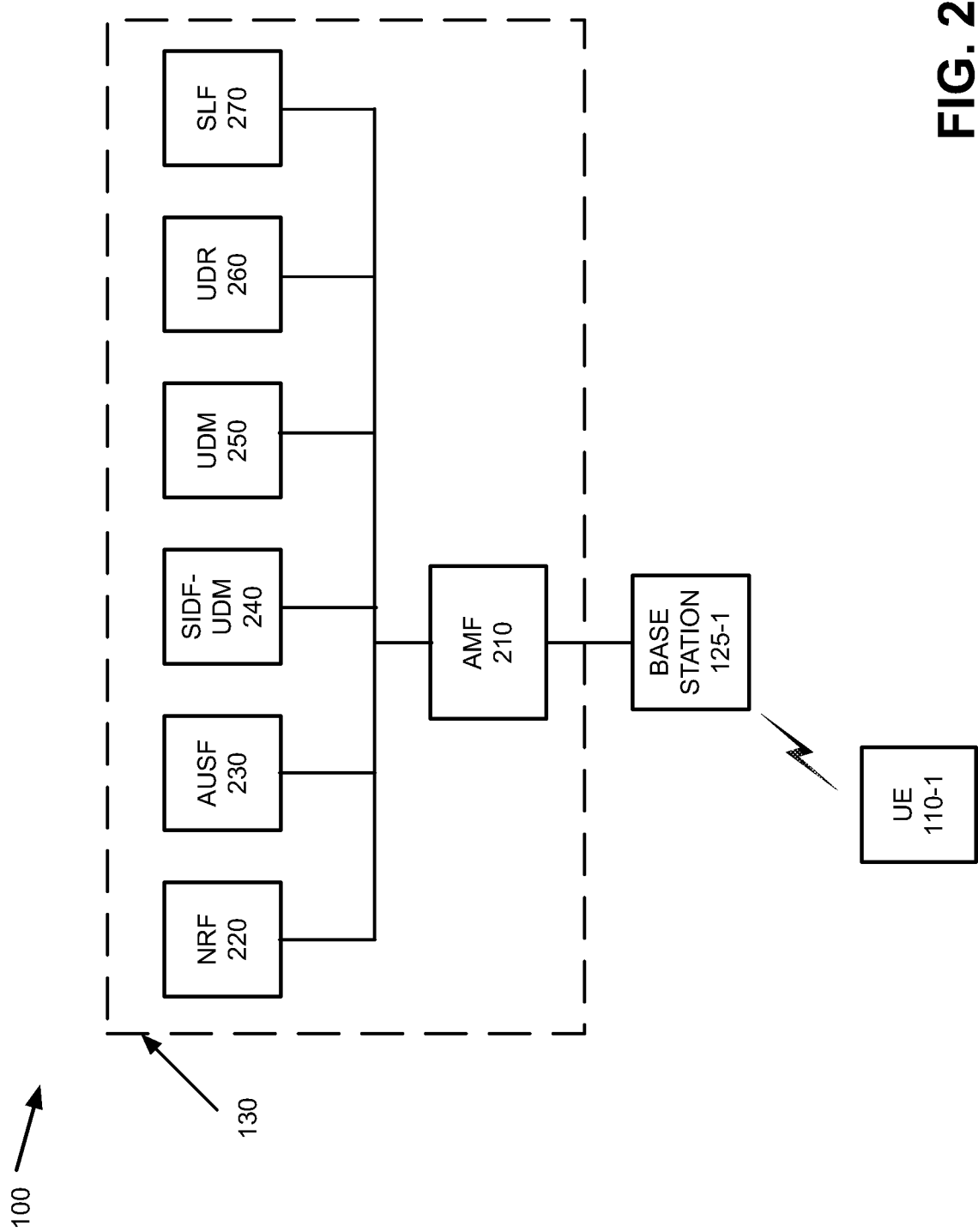
FIG. 2 illustrates elements implemented in the core network of FIG. 1 in accordance with an exemplary implementation.

FIG. 2 is a functional block diagram of a portion of environment 100 in accordance with an exemplary implementation. Referring to FIG. 2, core network 130 includes various network elements or functions, such as Access and Mobility Function (AMF) 210, Network Repository Function (NRF) 220, Authentication Server Function (AUSF) 230, Subscriber Identity De-concealing Function-Unified Data Management (SIDF-UDM) 240, Unified Data Management (UDM) 250, User Data Repository 260, and Subscriber Location Function (SLF) 270. These elements may be implemented in one or more core devices 135.

Core network 130 may also include other network devices/functions not shown in FIG. 2, such as a User Plane Function (UPF), a Session Management Function (SMF), an Application Function (AF), a Policy Control Function (PCF), a Charging Function (CHF), an Unstructured Data Storage Network Function (UDSF), a Network Slice Selection Function (NSSF), a 5G Equipment Identity Register (EIR). a Network Data Analytics Function (NWDAF), a Short Message Service Function (SMSF), a Security Edge Protection Proxy (SEPP), a packet gateway (PGW), a serving gateway (SGW), a home subscriber server (HSS), an authentication, authorization, and accounting (AAA) server, a mobility management entity (MME), a policy charging and rules function (PCRF), a charging system (CS), etc.

UEs 110-1 may communicate with core network 130 via base station 125. For example, UE 110-1 may connect to base station 125 when attempting to initially register for service with core network 130. Base station 125 may forward the communications from UE 110-1 to AMF 210 to initiate the registration, as described in detail below.

AMF 210 may perform registration management, connection management, reachability management, mobility management, lawful intercepts, Short Message Service (SMS) transport between UE 110 and a Session Management Session Function (not shown), session management messages transport between UE device 110 and a session management function (SMF) (not shown), access authentication and authorization, location services management, functionality to support non-3GPP access networks, and/or other types of management processes. AMF 210 may be accessible by other function nodes via one or more interfaces.

NRF 220 may support a service discovery function and maintain profiles of available network function (NF) devices/instances and their supported services. An NF profile may include an NF instance identifier (ID), an NF type, a Public Land Mobile Network (PLMN) ID associated with the NF, network slice IDs associated with the NF, capacity information for the NF, service authorization information for the NF, supported services associated with the NF, endpoint information for each supported service associated with the NF, and/or other types of NF information. Additionally, NRF 220 may include one or more transport network key performance indicators (KPIs) associated with the NF device/instance. NRF 220 may be accessible via one or more interfaces.

AUSF 230 may perform authentication of a user device that is requesting registration with the 5G network. For example, AUSF 230 may implement an 5G Authentication and Key Agreement (5G-AKA) authentication server and/or an Extensible Authentication Protocol (EAP) authentication server and may use authentication keys for UEs 110, such as authentication keys generated based on a subscription key stored in UDR 260, to authenticate UEs 110. AUSF 230 may be accessible via one or more user interfaces.

SIDF-UDM 240 may include logic to support decoding or decrypting a SUCI to obtain the SUPI for a UE 110 (e.g., UE 110-1). SIDF-UDM 240 may also include a UDM or be co-located with a UDM that provides traditional UDM functions. For example, SIDF-UDM 240 may maintain subscription information for UEs 110, manage subscriptions, generate authentication credentials, handle user identification, perform access authorization based on subscription data, perform network function registration management, maintain service and/or session continuity by maintaining assignment of SMF for ongoing sessions, support SMS delivery, support lawful intercept functionality, and/or perform other processes associated with managing user data. In accordance with an exemplary implementation, SIDF-UDM 240 may be independently addressable or accessible by other devices in environment 100, as described in detail below. For example, SIDF-UDM 240 may make available or expose its SUPI de-concealment services such that other NFs in environment 100 may request SIDF-UDM 240 to perform SUPI de-concealment (e.g., decode a SUCI to identify the SUPI), as described below.

UDM 250 may include elements similar to SIDF-UDM 240, with the exception of an SIDF. For example, UDM 250 may maintain subscription information for UEs 110, manage subscriptions, generate authentication credentials, handle user identification, perform access authorization based on subscription data, perform network function registration management, maintain service and/or session continuity by maintaining assignment of SMF for ongoing sessions, support SMS delivery, support lawful intercept functionality, and/or perform other processes associated with managing user data. In some implementations, UDM 250, and other UDMs 250 in core network 130 may include SIDF devices to decode SUCIs.

UDR 260 provides storage and retrieval services for structured data in core network 130. For example, UDR 260 may store subscription data used by SIDF-UDM 240/UDM 250, along with application data used by the network exposure functions.

SLF 270 may be implemented as a stand-alone function or integrated within a UDR 260. SLF 270 maintains information, e.g., as a database or other searchable structure, regarding subscriber devices (e.g., UEs 110) and the identity of a particular UDM 240/250 for use with the particular subscriber devices. Consistent with embodiments described herein, SLF 270 may also be configured to include a subscriber authorization parameter (SAP) that indicates what types of access scheme(s) each subscriber device is authorized to use during network registration. In some implementations, may take the form of a numeric or alphanumeric value (e.g., a binary value) indicating that a particular subscriber device (as defined by its unique SUPI or IMSI) is authorized for null-scheme access or is authorized for non-null-scheme access. In other implementations, more than two scheme authorizations may be enabled, in which case, a non-binary value may be used for the SAP.

As described below, an additional network function, referred to as a scheme authorization function (SAF) is implemented in core network 130. SAF may be configured to request, during a UE registration attempt, the SAP for the identified UE device 110. The SAF may receive the requested SAP from SLF 270 and, based on its value, may determine whether to allow or reject the requested access scheme. In some implementations, such as those described in relation to FIGS. 4-5B, the SAF may be implemented in AUSF 230. In such an implementation, access scheme authorization is made quickly during initial registration, thus allowing efficient scaling and further enabling efficient UDM selection, based on the type of authorized access scheme requested. In other implementations, such as those described in relation to FIGS. 6-7, the SAF may be implemented in UDM 250, which may request the SAP from UDR 260 only when a null-scheme access request is identified. This implementation minimizes network signaling, since compliant, non-null-scheme access requests are handled without any additional signaling.

Although FIG. 2 shows exemplary components core network 130, in other implementations, core network 130 may include fewer components, different components, differently arranged components, or additional components than depicted in FIG. 2. Additionally or alternatively, one or more components of core network 130 may perform functions described as being performed by one or more other components of core network 130.

In addition, while FIG. 2 depicts a single AMF 210, NRF 220, AUSF 230, SIDM-UDM 240, UDM 250, UDR 260, and SLF 270, for illustration purposes, in practice, core network 130 may include multiple AMFs 210, NRFs 220, AUSFs 230, SIDF-UDMs 240, UDMs 250, UDRs 260, and SLFs 270. Further, the components depicted in FIG. 2 may be implemented as dedicated hardware components, software components, a combination of hardware and software components and/or as virtualized functions implemented via a common shared physical infrastructure.

FIG. 3 illustrates an exemplary configuration of a device 300. One or more devices 300 may correspond to or be included in UEs 110, base stations 125, core devices 135 and/or be used to implement one or more of core devices 135. For example, one or more devices 300 may be used to implement AMF 210, NRF 220, AUSF 230, SIDF-UDM 240, UDM 250, UDR 260, and/or SLF 270. Referring to FIG. 3, device 300 may include bus 310, processor 320, memory 330, input device 340, output device 350 and communication interface 360. Bus 310 may include a path that permits communication among the elements of device 300.

Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SSD). Memory 330 may also include a magnetic and/or optical recording medium (e.g., a hard disk) and its corresponding drive.

Input device 340 may include a mechanism that permits a user to input information, such as a keypad, a keyboard, a mouse, a pen, a microphone, a touch screen, voice recognition and/or biometric mechanisms, etc. Output device 350 may include a mechanism that outputs information to the user, including a display (e.g., a liquid crystal display (LCD)), a speaker, etc. In some implementations, device 300 may include a touch screen display may act as both an input device 240 and an output device 350.

Communication interface 360 may include one or more transceivers that device 300 uses to communicate with other devices via wired, wireless or optical mechanisms. For example, communication interface 360 may include one or more radio frequency (RF) transmitters, receivers and/or transceivers and one or more antennas for transmitting and receiving RF data. Communication interface 360 may also include a modem or an Ethernet interface to a LAN or other mechanisms for communicating with elements in a network.

In an exemplary implementation, device 300 performs operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), SSD, etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Although FIG. 3 shows exemplary components of device 300, in other implementations, device 300 may include fewer components, different components, differently arranged components, or additional components than depicted in FIG. 3.

Figure 5A:
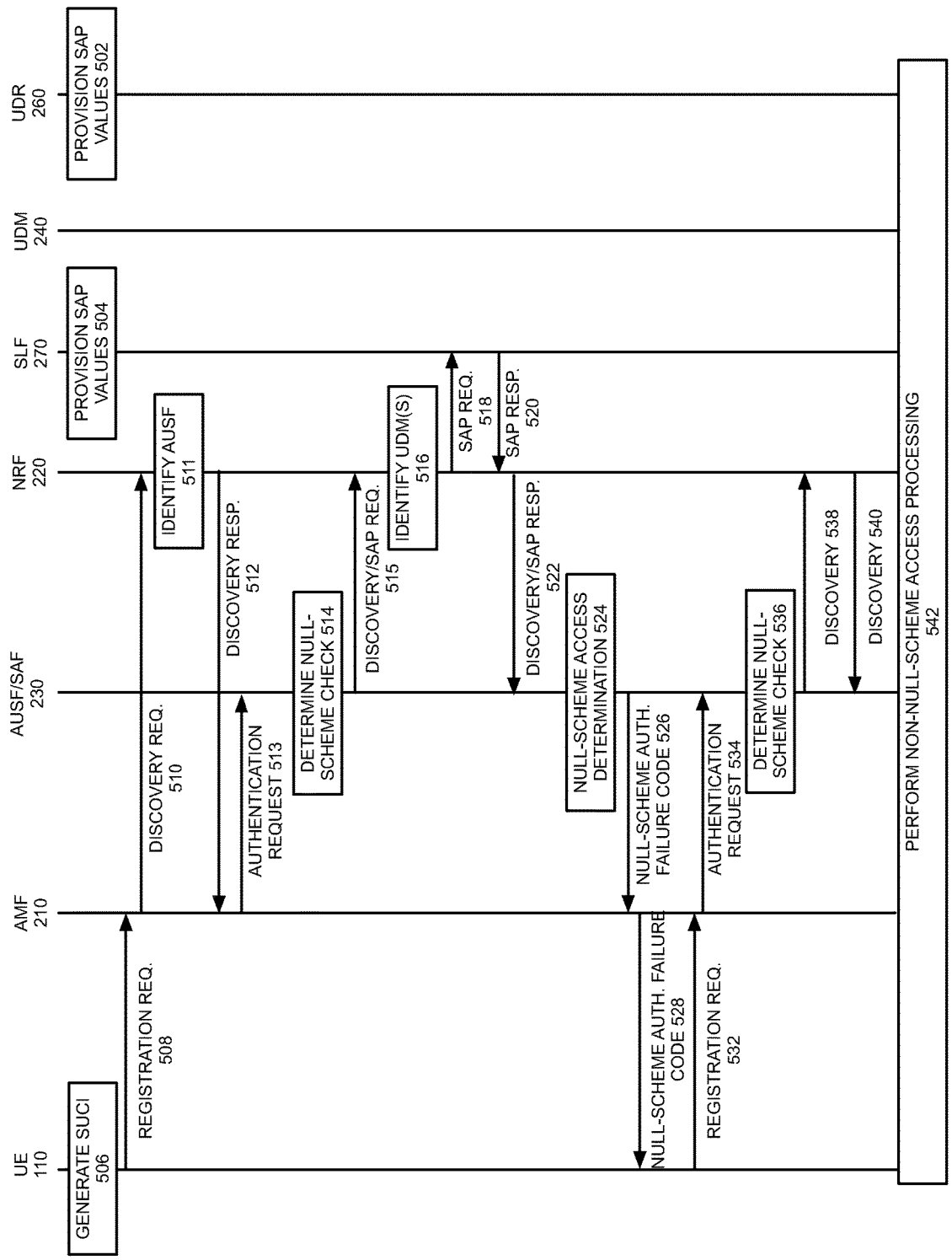

FIG. 4 is a flow diagram 400 illustrating processing associated with null-scheme access authorization in accordance with an exemplary implementation and FIGS. 5A and 5B are exemplary signal flow diagrams associated with the processing of FIG. 4, with FIG. 5A depicting an unauthorized null-scheme signal flow and FIG. 5B depicting an authorized null-scheme signal flow. Processing may begin with the service provider provisioning SAP values for subscriber devices at one or more core network components (block 402). For example, the service provide may pre-provision SAP values for subscriber devices at each of UDR 260 (element 502) and SLF 270 (element 504). As described above, in some embodiments SLF 270 may be integrated into UDR 260. Consistent with implementations described herein, SLF may store the SAP values for each UE 110 based on the UE 110's SUPI or other device identifier (e.g., IMSI, etc.). By way of example, assume that a first UE 110-1, having a first SUPI-1 is associated with a first SAP-1 that indicates UE 110-1 is authorized for only non-null-scheme access, while a second UE 110-2, having a second SUPI-2 is associated with a second SAP-2 that indicates UE 110-2 is also authorized for null-scheme access in non-emergency scenarios.

A registration request that indicates null-scheme or non-null-scheme access is received by AMF 210 (block 404). For example, upon power up, UE 110 generates a SUCI (element 506). The SUCI may include a SUCI type field, a home network identifier field, a routing indicator field, a protection scheme field, a home network public key identifier (ID) field which may identify the key used to generate the SUCI from the SUPI, and a protection scheme output field. For non-null-scheme access (as designated by the value of the protection scheme field), the protection scheme output field stores the SUPI which has been encrypted using an encryption key that is generated by the user device based on the cryptographic algorithm and the home network public key that has been provisioned within the UICC card. For null-scheme access (as designated by the value of the protection scheme field), the protection scheme output field includes a plain text SUPI. Using the generated SUCI, UE 110 transmits the registration request to AMF 210 (FIG. 5A, signal 508).

AMF 210 receives the registration request and retrieves the routing indicator from the SUCI included in the registration request (block 406). AMF 210 may then transmit an AUSF discovery request with the routing indicator to NRF 220 to identify an AUSF that will handle authentication for UE 110 (block 408; signal 510). In some implementations, AMF 210 may, as part of the discovery request, determine whether the UE 110 is requesting to use null-scheme and therefore discover one or more AUSFs that has the SAF functionality described herein. NRF 220 receives the AUSF discovery request and searches its database to attempt to identify one or more AUSF network function (NF) profile that matches the received routing indicator and/or having the SAF functionality.

NRF 220 may then select or identify an AUSF 230 or AUSF instance that may be located physically closest to AMF 210's location or other factors such as having SAF as part of the AUSF, and returns the fully qualified domain name (FQDN) of the selected AUSF 230 to AMF 210 (block 410; block 511 and signal 512). AMF 210 receives the discovery response and sends a UE Authentication request to the identified AUSF 230 along with the SUCI (block 412, signal 513). AUSF 230 receives the authentication request and determines the protection scheme type (e.g., for non-null-scheme access or null-scheme access, as identified in the SUCI header), and initiates discovery or selection of an appropriate UDM 240/250 for use with the received request (block 414). Further, consistent with the embodiment of FIGS. 4, 5A, and 5B, AUSF 230 includes SAF functionality and determines whether a null-scheme authorization check is required (block 416)(FIG. 5A, element 514).

If AUSF/SAF 230 determines that the UE Authentication request indicates a null-scheme access protection scheme (block 416—NULL-SCHEME), AUSF/SAF 230 may initiate UDM discovery and the null-scheme access authorization process, as described below (block 418). In particular, AUSF/SAF 230 transmits one or more Discover UDM and SAP request messages that includes the SUPI to NRF 220 (block 420, signal 515). In response, NRF 220 may determine the identity of one or more appropriate UDMs 240/250 (block 422, element 516) and send a corresponding SAP request message to SLF 270 (block 424, signal 518). SLF 270 retrieves the corresponding SAP value for the SUPI identified in the SAP request message (block 426) and transmits a response message to NRF 220 that includes the retrieved SAP value (block 428, signal 520). NRF 220 then transmits a response message to AUSF/SAF 230 that includes the location(s) (e.g., the FQDN) of the identified UDMs 240/250 and the SAP value received from SLF 270 (block 430, signal 522).

Although not depicted in FIG. 4, in other implementations consistent with embodiments described herein, NRF 220 may be configured to provide a location for SLF 270 to AUSF/SAF 230 rather than directly interface with SLF 270. In such an implementation, upon receipt of SLF location information, AUSF/SAF 230 may send an SAP request message to SLF 270 and receive a response therefrom. In either implementation, AUSF/SAF ultimately receives the SAP value associated with UE 110.

Returning to FIG. 4, in response to the received response message from NRF 220, AUSF/SAF 230 determines whether UE 110 is authorized for null-scheme access (block 432, element 524). For example, AUSF/SAF 230 may determine whether the received SAP value indicates that null-scheme access is authorized. If AUSF/SAF 230 determines that UE 110 is not authorized for null-scheme access (block 432—NO) a null-scheme authorization failure code is transmitted to AMF 210 that indicates that null-scheme access is not authorized and requires registration with a non-null-scheme protection scheme (block 434, signal 526). AMF 210 then forwards the null-scheme authorization failure code to UE 110 (block 436, signal 528). In some implementations, AUSF/SAF 230 may report or record each instance of a null-scheme authorization failure for auditing purposes. For example, AUSF/SAF 230 may transmit a record of the null-scheme authentication failure to UDR 260 for subsequent review/retrieval. In some other implementations, AUSF/SAF 230 may report or record authorization failure to the use of a null-scheme but does not send an authorization failure code to the AMF and allows the UE 110 to perform an authentication process in order to complete the registration process.

Returning to block 432, if AUSF/SAF 230 determines that UE 110 is authorized for null-scheme access (block 432—YES, FIG. 5B, element 524), AUSF/SAF 230 does not generate a null-scheme authorization failure code and allows the UE 110 to perform a non-null-scheme access process that includes an authentication procedure in order to complete the registration of the UE 110 to the network (block 438, element 530). In particular, AUSF/SAF 230 selects the appropriate null-scheme UDM 240/250 (e.g., non SIDF-UDM 250) and performs authentication of the UE 110 via traditional null-scheme access processing.

Returning to block 436, in response to receipt of a null-scheme authorization failure code, UE 110 may, if possible, return to block 404 and transmit a new registration request message for a new non-null-scheme SUCI to AMF 210 using a non-null-scheme protection scheme (FIG. 5A, signal 532). Processing continues as above to block 416, where it is again determined whether the UE Authentication request indicates a null-scheme access protection scheme. In this instance, when AUSF/SAF 230 determines (FIG. 5A, element 536) that the UE Authentication request indicates a non-null-scheme access protection scheme (block 416—NON-NULL-SCHEME), AUSF/SAF 230 initiates UDM discovery for non-null-scheme access, as described below (block 440, FIG. 5A, element 536). In contrast to block 418 described above, AUSF/SAF 230 determines that no null-scheme access authorization is required based on the protection scheme field in the SUCI.

Next, AUSF/SAF 230 transmits a Discover UDM message that includes the SUCI and the routing identifier to NRF 220 (block 442, signal 538). In response, NRF 220 may determine the identity of an appropriate UDM (e.g., SIDF-UDM 240 that includes SIDF capabilities) (block 444) and transmit a response message to AUSF/SAF 230 that includes the location (e.g., the FQDN) of the identified SIDF-UDM 240 (block 446, signal 540). In some implementations, different protection scheme access types may be supported beyond null-scheme and non-null-scheme, such as multiple different non-null-scheme formats. In such instances, Discover UDM message 238 may instruct NRF 220 to obtain and return the SAP value for UE 110, as described above, even though non-null-scheme access has been requested. In any event, upon receipt of the location of one or more UDMs 240/250, AUSF/SAF 230 then performs conventional de-concealment processing with an identified SIDF-UDM 240 (block 448, element 542), followed by an authentication procedure in order to complete the UE registration process.

Figure 7:
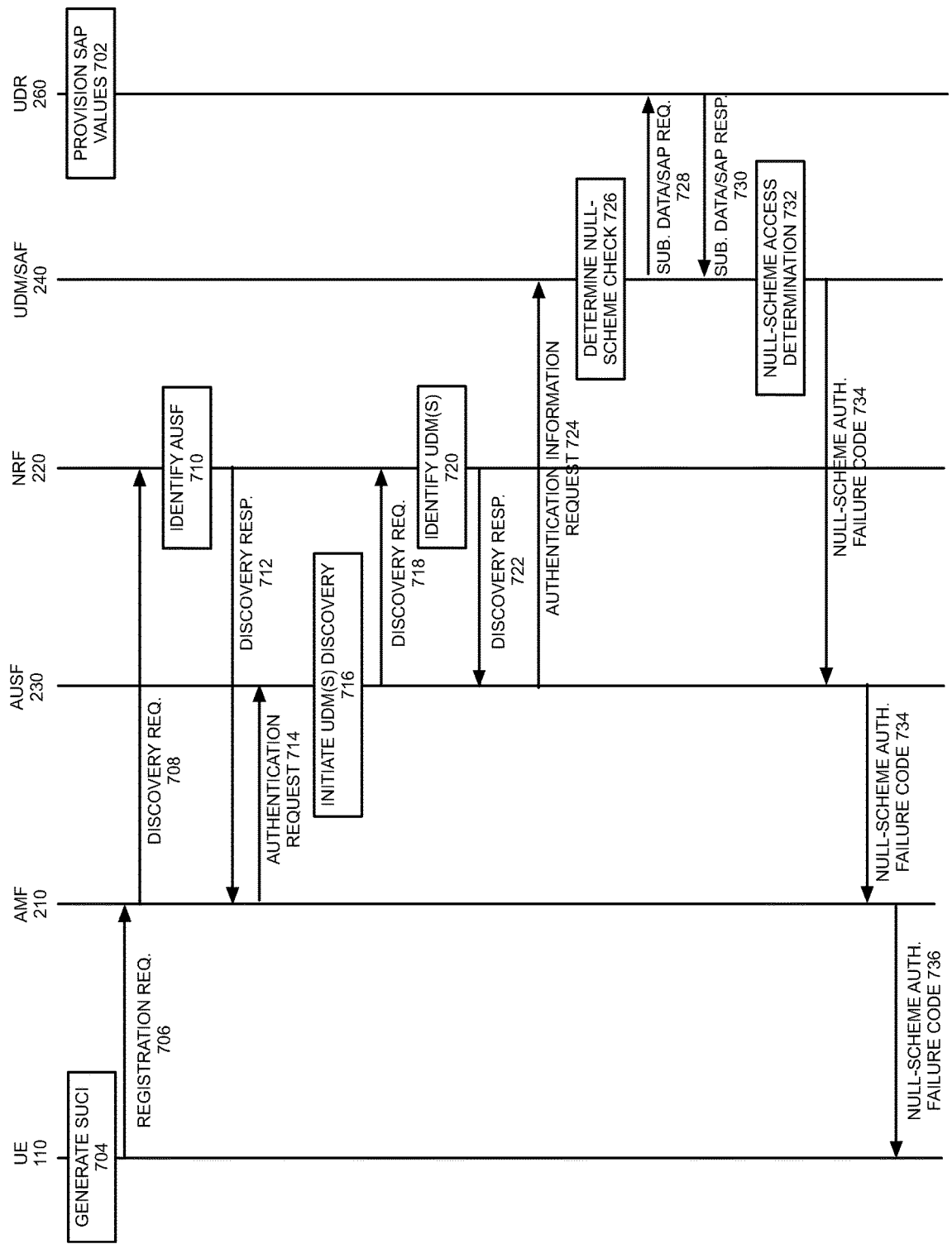
FIG. 7 is an exemplary signal flow diagram associated with the processing of FIG. 6.

FIG. 6 is a flow diagram 600 illustrating processing associated with null-scheme access authorization in accordance with another exemplary implementation and FIG. 7 is an exemplary signal flow diagram associated with the processing of FIG. 6. In the embodiment of FIGS. 6 and 7, in contrast to the embodiment of FIGS. 4-5B, null-scheme access authorization processing is performed at the UDM.

Process 600 may begin with the service provider provisioning SAP values for subscriber devices at one or more core network components (block 602). For example, the service provider may pre-provision SAP values for subscriber devices at UDR 260 (element 702). Consistent with implementations described herein, UDR 260 may store the SAP values for each UE 110 based on the UE 110's SUPI or other device identifier (e.g., IMSI, etc.).

A registration request that indicates null-scheme or non-null-scheme access is received by AMF 210 (block 604). By way of example, assume that UE 110 uses null-scheme to generate its SUCI. Using the generated SUCI, UE 110 transmits the registration request to AMF 210 (FIG. 7, signal 706).

AMF 210 receives the registration request and retrieves the routing indicator from the SUCI included in the registration request (block 606). AMF 210 may then transmit an AUSF discovery request with the routing indicator to NRF 220 to identify an AUSF that will handle authentication for UE 110 (block 608; signal 708). NRF 220 receives the AUSF discovery request and searches its database to attempt to identify an AUSF network function (NF) profile that matches the received routing indicator.

NRF 220 may then select or identify an AUSF 230 or AUSF instance and return the fully qualified domain name (FQDN) of the selected AUSF 230 to AMF 210 (block 610; element 710 and signal 712). AMF 210 receives the discovery response and sends a UE Authentication request to the identified AUSF 230 along with the SUCI (block 612, signal 714).

Next, AUSF 230 initiates a UDM discovery process based on the received UE Authentication request (block 614, element 716). AUSF 230 transmits a Discover UDM message that includes the SUCI to NRF 220 (block 616, signal 718). In response, NRF 220 may determine the identity of an appropriate UDM (e.g., SIDF-UDM/SAF 240, also referred to as UDM/SAF 240) (block 618, element 720). In response, NRF 220 then transmits a response message to AUSF 230 that includes the location (e.g., the FQDN) of the identified UDM/SAF 240 (block 620, signal 722).

Based on the received response from NRF 220, AUSF 230 sends an Authentication Information request message to the identified UDM/SAF 240 that includes at least the SUCI for UE 110 (block 622, signal 724). As noted above, consistent with the embodiment of FIGS. 6 and 7, SAF functionality is integrated into SIDF-UDM 240 and performs the null-scheme authorization processing described herein. In particular, UDM/SAF 240 determines whether the received Authentication Information request message (signal 724) indicates a request for null-scheme access (block 624, element 726). For example, UDM/SAF 240 determines that the protection scheme field of the received SUCI for UE 110 indicates a null-scheme protection scheme.

When UDM/SAF 240 determines that non-null-scheme access is requested (block 624—NO), a traditional de-concealment process is invoked (block 626, not shown in FIG. 7). However, when UDM/SAF 240 determines that null-scheme access is requested (block 624—YES), a subscription-data and SAP request message is sent to UDR 260 (block 628, signal 728). For example, UDM/SAF 240 may extract the plain text SUPI from the received Authentication Information request message and may generate the Subscription-data and SAP request message based on the extracted SUPI. In response, UDR 260 retrieves the relevant SAP and other subscription information based on the SUPI (block 630) and transmits a response message to UDM/SAF 240 (block 630, signal 730).

UDM/SAF 240 then determines whether null-scheme access is authorized based on the received SAP (block 632, element 734). For example, UDM/SAF 240 determines whether the SAP for UE 110 indicates whether null-scheme access is authorized. If null-scheme access is not authorized (block 632—NO), a null-scheme authorization failure code message is transmitted to AUSF 230 that indicates that null-scheme access is not authorized and requires registration with a non-null-scheme protection scheme (block 634, signal 734). In some implementations, UDM/SAF 240 may report or record each instance of a null-scheme authentication failure for auditing purposes. For example, UDM/SAF 240 may transmit a record of the null-scheme authentication failure to UDR 260 for subsequent review/retrieval. In some other implementations, UDM/SAF 240 may report or record authorization failure to the use of a null-scheme but does not send an authorization failure code to the AUSF and allows the UE 110 to perform an authentication process in order to complete the registration process.

In response to the received null-scheme authentication failure code message, the AUSF 230 may forwards the null-scheme authentication failure code message to AMF 210, which then forwards the null-scheme authentication failure code to UE 110 (block 636 signals 734/736).

Returning to block 632, if UDM/SAF 240 determines that null-scheme access is authorized (block 632—YES), UDM/SAF 240 does not generate a null-scheme authorization failure code and allows network access to be authenticated and network registration to proceed using traditional null-scheme processing (block 640, not shown in FIG. 7).

Figure 8:
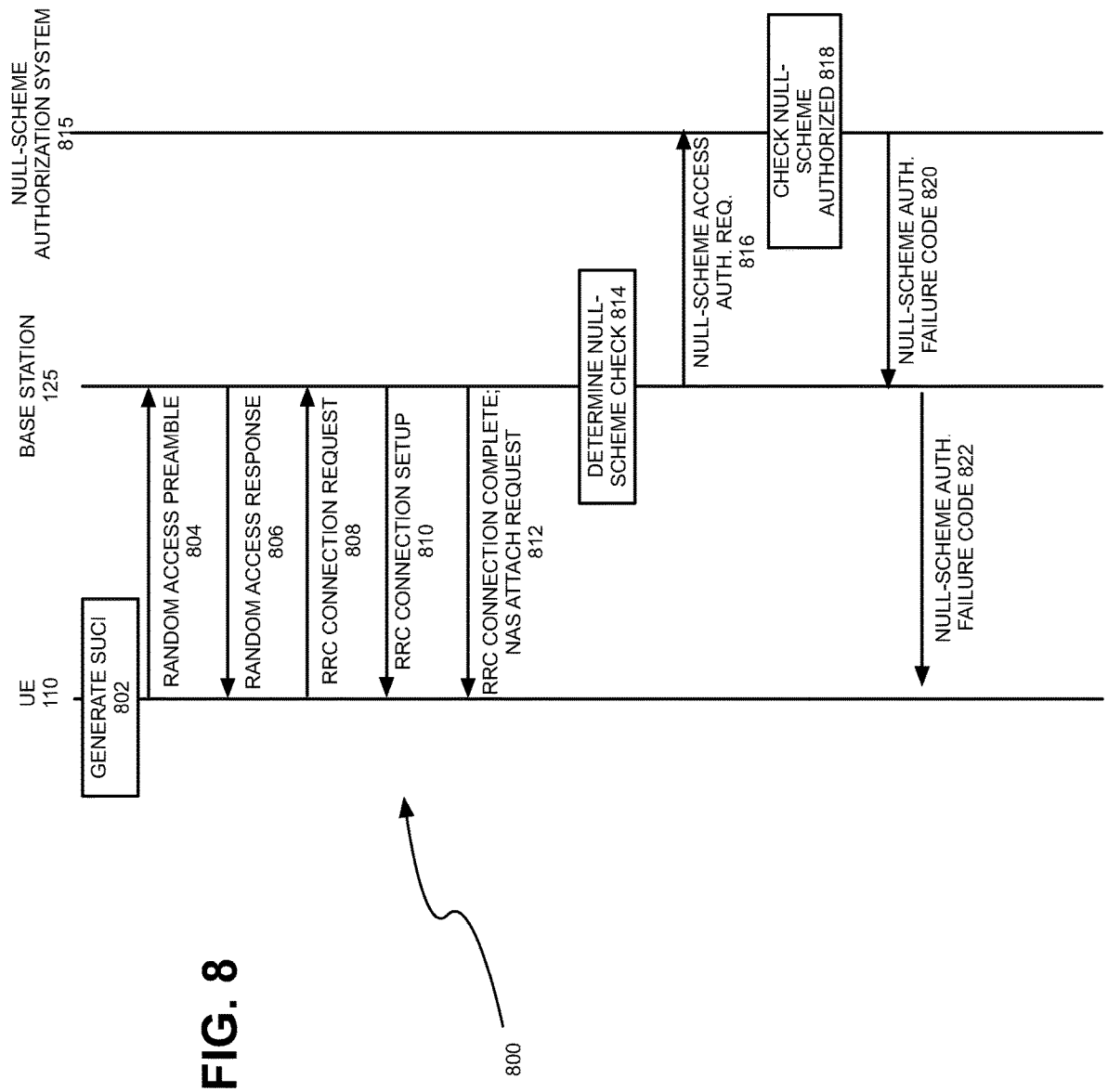
FIG. 8 is an exemplary signal flow diagram in accordance with another exemplary implementation.

FIG. 8 is a signal flow diagram illustrating a RAN-based null-scheme access process 800 consistent with implementations described herein. Process 800 begins when UE 110 generates/calculates a SUCI in the manner described above (element 802). Next, as shown, in the example of FIG. 8, during attachment to a base station 125 (e.g., a gNodeB), UE 110 sends a Random Access Preamble message to base station 125 over a Physical Random Access Channel (PRACH) (signal 804), which elicits a Random Access Response from base station 125 (signal 806) to synchronize UE 110 with base station 125. Once synchronized, UE 110 sends a request for an RRC connection to base station 125 over an uplink shared channel (UL-SCH) to establish RAN connectivity and services (signal 808). In response, base station 125 may transmit an RRC Connection Setup message to UE 110 (signal 810). Upon receiving the RRC Connection setup message, UE 110 may respond by sending an RRC Setup Complete message to base station 125, indicating that the RRC Connection setup is complete and including a non-access stratum (NAS) attach request (signal 812). The NAS attach request message includes the SUCI generated by UE 110.

Consistent with implementations described herein, in response to the NAS attach request message, base station 125 may be configured to determine whether the SUCI included in the message includes a protection scheme field that indicates null-scheme access (element 816). If the SUCI does not indicate a null-scheme protection scheme, base station 125 may be configured to proceed with authentication/registration in a traditional manner (not shown in FIG. 8). However, if the SUCI indicates a null-scheme protection scheme, base station 125 transmits a query (signal 818) to a null-scheme authorization system 815.

For example, consistent with implementations described herein, null-scheme authorization system 815 may include an SAF component maintained at base station 125 or associated proximate devices, such as a multi-access edge computing (MEC) device, a distributed unit (DU), etc. In such an implementation, SAF/RAN may initiate the null-scheme access request process, which may query a database at a RAN location or SLF or UDR to obtain the SAP for the requesting UE device 110. The SAF/RAN then makes the determination if the UE is authorized or not. Alternatively, when the SAP is maintained at a database in core network 130, AMF 210 may query an appropriate AUSF 230 and AUSF 230 may query either SLF 270 via NRF 220 or directly; or alternatively, AUSF 230 may query UDM 240/250 and then the UDR 260 as described above with respect to FIGS. 7 and 8.

Upon receipt of the query, null-scheme authorization system 815 may determine whether the requested null-scheme access is authorized (element 820). If not, null-scheme authorization system 815 may transmit an authorization failure code to base station 125 indicating that null-scheme access is not allowed for the particular UE 110 attempting to attach (signal 822). In response, base station 125 may transmit a message to UE 110 informing it of the failure (signal 824).

If null-scheme authorization system 815 determines that null-scheme access is authorized for UE 110, null-scheme authorization system 815 may transmit an authorization response to base station 125 indicating that null-scheme access is permissible for the particular UE 110 attempting to attach (not shown in FIG. 8). In response, base station 125 continues with traditional null-scheme (e.g., emergency call) attachment/authentication/registration.

Consistent with embodiments described herein, UE 110 may be authorized for null-scheme access for only particular devices and subscriber-based use cases. For example, instances in which a UICC card has not yet been provisioned to perform non-null-scheme SUCI calculation, instances in which a UICC card has been provisioned incorrectly for SUCI calculation, instances in which a subscriber has not subscribed to 5G standalone (SA) service which may require non-null SUCI calculation, and instances in which a UE with a 4G SIM is not able to properly calculate a SUCI on its own.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

Further, while series of acts have been described with respect to FIGS. 4 and 6 and signal flows with respect to FIGS. 5 and 7, the order of the acts and/or signal flows may be different in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

To the extent the aforementioned implementations collect, store or employ personal information of individuals, groups or other entities, it should be understood that such information shall be used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   receiving, at a network device, a registration request that comprises a subscription concealed identifier (SUCI) associated with a user equipment (UE) device;
   determining, by the network device, whether the SUCI indicates a request for null-scheme network access;
   retrieving, by the network device and from at least one of a user data repository (UDR) device or a subscriber location function (SLF) device, a scheme authorization parameter for the UE device when it is determined that the SUCI indicates a request for null-scheme network access,
   wherein the scheme authorization parameter indicates whether the UE device is authorized for null-scheme access to a service provider network;
   determining, by the network device, whether the UE device is authorized for null-scheme network access based on the retrieved scheme authorization parameter;
   performing, by the network device, processing associated with null-scheme network access when it is determined that the UE device is authorized for null-scheme network access.

2. The method of claim 1, further comprising:
   preventing null-scheme network access when it is determined that the UE device is not authorized for null-scheme network access.

3. The method of claim 2, wherein preventing null-scheme network access comprises:
   generating, by the network device, a registration failure code; and
   performing at least one of:
      forwarding the registration failure code to the UE device, or
      generating a notification based on the registration failure code.

4. The method of claim 3, further comprising:
   logging the registration failure code for subsequent retrieval and review.

5. The method of claim 1, wherein the network device comprises an authentication server function (AUSF) device that includes a scheme authorization function.

6. The method of claim 5, the method further comprising:
   transmitting, by the AUSF device and to a network repository function (NRF) device, a discover unified data management (UDM) device and scheme authorization parameter request,
   wherein the NRF device is configured to identify one or more UDM devices based on the request and retrieve the scheme authorization parameter from the UDR device or SLF device;
   receiving, by the AUSF device, the identification of the one or more UDM devices and the scheme authorization parameter from the NRF device; and
   determining, by the AUSF device, whether the UE device is authorized for null-scheme network access based on the received scheme authorization parameter.

7. The method of claim 1, wherein the network device comprises a unified data management (UDM) device that includes a scheme authorization function.

8. The method of claim 7, the method further comprising:
   receiving, by the UDM device, an authentication information request that includes the SUCI;
   transmitting, by the UDM device, a scheme authorization parameter request;
   receiving, by the UDM device, the scheme authorization parameter; and
   determining, by the UDM device, whether the UE device is authorized for null-scheme network access based on the received scheme authorization parameter.

9. The method of claim 1, wherein the network device comprises a radio access network (RAN) device.

10. The method of claim 9, further comprising:
    receiving, from the UE device and by the RAN device, an attach request message that includes the SUCI;
    determining, by the RAN device, whether the SUCI indicates a request for null-scheme network access; and
    performing, by the RAN device, null-scheme authorization when it is determined that the SUCI indicates a request for null-scheme network access.

11. A network device comprising:
    at least one processor,
    wherein the at least one processor is configured to:
       receive a registration request that comprises a subscription concealed identifier (SUCI) associated with a user equipment (UE) device;

determine whether the SUCI indicates a request for null-scheme network access;

retrieve, from at least one of a user data repository (UDR) device or a subscriber location function (SLF) device, a scheme authorization parameter for the UE device when it is determined that the SUCI indicates a request for null-scheme network access, wherein the scheme authorization parameter indicates whether the UE device is authorized for null-scheme access to a service provider network;

determine whether the UE device is authorized for null-scheme network access based on the retrieved scheme authorization parameter; and perform processing associated with null-scheme network access when it is determined that the UE device is authorized for null-scheme network access.

12. The network device of claim 11, wherein the at least one processor is further configured to prevent null-scheme network access when it is determined that the UE device is not authorized for null-scheme network access.

13. The network device of claim 11, wherein the at least one processor is further configured to:

generate a registration failure code when it is determined that the UE device is not authorized for null-scheme network access; and perform at least one of:
forward the registration failure code to the UE device,
generate a notification based on the registration failure code, or
log the registration failure code for future auditing.

14. The network device of claim 11, wherein the network device comprises an authentication server function (AUSF) device that includes a scheme authorization function.

15. The network device of claim 14, wherein the at least one processor is further configured to:

transmit a discover unified data management (UDM) device and scheme authorization parameter request to a network repository function (NRF) device, wherein the NRF device is configured to identify one or more UDM devices based on the request and retrieve the scheme authorization parameter from the UDR device or SLF device;

receive the identification of the one or more UDM devices and the scheme authorization parameter from the NRF device; and determine whether the UE device is authorized for null-scheme network access based on the received scheme authorization parameter.

16. The network device of claim 11, wherein the network device comprises a unified data management (UDM) device that includes a scheme authorization function.

17. The network device of claim 16, wherein the at least one processor is further configured to:

receive an authentication information request that includes the SUCI;

transmit a scheme authorization parameter request;

receive the scheme authorization parameter in response to the scheme authorization parameter request; and determine whether the particular UE device is authorized for null-scheme network access based on the received scheme authorization parameter.

18. A non-transitory computer-readable medium having stored thereon sequences of instructions which, when executed by at least one processor, cause the at least one processor to:

receive, at a network device, a registration request that comprises a subscription concealed identifier (SUCI) associated with a user equipment (UE) device;

determine, by the network device, whether the SUCI indicates a request for null-scheme network access;

retrieve, by the network device and from at least one of a user data repository (UDR) device or a subscriber location function (SLF) device, a scheme authorization parameter for the UE device when it is determined that the SUCI indicates a request for null-scheme network access, wherein the scheme authorization parameter indicates whether the UE device is authorized for null-scheme access to a service provider network;

determine, by the network device, whether the UE device is authorized for null-scheme network access based on the retrieved scheme authorization parameter; and perform, by the network device, processing associated with null-scheme network access when it is determined that the UE device is authorized for null-scheme network access.

19. The non-transitory computer-readable medium of claim 18, wherein the instructions further cause the at least one processor to:

generate, by the network device, a registration failure code; and perform at least one of:
forward the registration failure code to the UE device,
generate a notification based on the registration failure code, or
log the registration failure code for future auditing.

20. The non-transitory computer-readable medium of claim 18, wherein the instructions further cause the at least one processor to:

transmit a discover unified data management (UDM) device and scheme authorization parameter request to a network repository function (NRF) device, wherein the NRF device is configured to identify one or more UDM devices based on the request and retrieve the scheme authorization parameter from the UDR device or SLF device;

receive the identification of the one or more UDM devices and the scheme authorization parameter from the NRF device; and determine whether the UE device is authorized for null-scheme network access based on the received scheme authorization parameter.

\* \* \* \* \*